United States Patent
Dolazza et al.

[11] Patent Number: 5,815,418
[45] Date of Patent: Sep. 29, 1998

[54] CONTINUOUS SELF-CALIBRATING DATA ACQUISTION SYSTEM

[75] Inventors: Enrico Dolazza, Boston; Roger Finch, Ipswich, both of Mass.

[73] Assignee: Analogic Corporation, Peabody, Mass.

[21] Appl. No.: 594,424

[22] Filed: Jan. 31, 1996

[51] Int. Cl.⁶ ...................................................... H04N 1/40
[52] U.S. Cl. .................... 364/582; 364/413.13; 358/446; 250/362
[58] Field of Search ................................ 364/582, 413.13, 364/413.14, 570; 358/406, 446; 250/362, 363; 327/142, 337; 348/247, 255, 458

[56] References Cited

U.S. PATENT DOCUMENTS

| | | | |
|---|---|---|---|
| 4,068,306 | 1/1978 | Chen et al. | 364/414 |
| 4,163,947 | 8/1979 | Weedon | 328/128 |
| 4,891,757 | 1/1990 | Shroy, Jr. et al. | 364/413.13 |
| 5,053,770 | 10/1991 | Mayer et al. | 341/118 |
| 5,272,627 | 12/1993 | Maschhoff et al. | 364/413.15 |
| 5,563,723 | 10/1996 | Beaulieu et al. | 358/461 |

*Primary Examiner*—Emanuel T. Voeltz
*Assistant Examiner*—Kamini S. Shah
*Attorney, Agent, or Firm*—Lappin & Kusmer LLP

[57] ABSTRACT

A system for and method of compensating for performance differences in a set of information channels is disclosed. The system and method model each channel as linear and characterizes the channel by an offset and a gain. The system includes memory for storing the offsets and gains associated with the N channels. The system further includes means for mathematically adjusting the output of each information channel by that channel's associated offset and gain. The system further includes filters for reducing the effect of random noise on the measurements of the offsets and gains by generating signals representative of time weighted averages of the offsets and gains.

32 Claims, 4 Drawing Sheets

CONTINUOUS SELF-CALIBRATING DATA ACQUISTION SYSTEM

RELATED APPLICATIONS

This application is related to U.S. patent application Ser. No. 08/594,122, now allowed, entitled Apparatus for and Method of Autozeroing the Input of a Charge-to-Voltage Converter filed in the names of Hans Weedon and Roger Finch (Attorney's Docket No. ANA-51); U.S. patent application Ser. No. 08/594,426, now allowed, entitled Apparatus for and Method of Autozeroing the Output of a Charge-to-Voltage Converter, filed in the names of Enrico Dolazza, Hans Weedon and Roger Finch (Attorney's Docket No. ANA-52); and U.S. patent application Ser. No. 08/594,425, entitled Reset Charge Compensation Circuit, filed in the names of Roger Finch, and Hans Weedon (Attorney's Docket No. ANA-67); all filed on the same day as the present application, and all incorporated herein by reference.

FIELD OF THE INVENTION

The present invention relates generally to apparatus for and methods of calibrating charge-to-voltage converters of a data acquisition system, and more particularly to such apparatus and methods for use with input signals of very low amplitudes.

BACKGROUND OF THE INVENTION

While a number of autozeroing circuits are known and have proven effective generally, such as those described in U.S. Pat. Nos. 4,163,947 and 5,053,770, their utility is seriously impaired when processing electrical signals of extremely low amplitude.

For example, digital or computed radiology is a known technique in which X-ray latent images are formed on a special substrate or plate rather than the usual X-ray film. In one form of computed radiology, the latent image is scanned with a laser and each image pixel is read out as an electrical charge. Computed radiology is superior to X-ray films for several reasons.

The substrate is typically erasable and reusable, while X-ray film is not. Secondly, physical examinations call for a predetermined level of X-ray energy depending upon which part of the body is being X-rayed, i.e., a peak voltage and maximum milliampere level for powering the X-ray source, and in the case of a pulsed X-ray source, the time duration of each pulse driving the pulsed X-ray source. If the parameters of the X-ray exposure are wrong the resulting X-ray image recorded on film tends to be either under or over exposed, because of the mismatch between the X-ray flux and the film dynamic range, resulting in poor diagnostic quality images. Yet another advantage of computed radiology is that information derived from the latent image formed in the substrate intrinsically can be formed as a digital data file. The data is therefore easily stored in memory and archived, and more readily transferred than information contained in X-ray film, without deterioration of data. Thus, various digital processing algorithms and techniques become available making it easier to process the data, such as spatial filtering and other image enhancement techniques and transfer the data from one location to another, by network or modem, for example.

A fourth advantage of computed radiology, at least with respect to certain substrate materials, is that the X-ray dosage can be reduced because the material used has a higher DQE than that of standard X-ray film.

In the U.S. the estimate of X-ray images recorded on film that are so poor as to require the retaking of the image ("recall") is estimated to be around 20%. Radiologists expect this number to go up, because of greater reliance on X-ray technicians who are typically less trained and often less skillful than the average radiologist. On the other hand, in computed radiology the signals representative of pixels of a latent image on a plate can be digitized over a sufficiently large dynamic range so that one should not have to retake the X-ray image.

In a certain implementation of computed radiology, an exposed X-ray plate is scanned, for example by a laser beam, and each pixel defined area of the plate is read over a time of about 30 to 70 $\mu$sec to permit the full charge of the reading to be collected into a charge-to-voltage conversion device. The resulting voltages are then typically converted to digital format for storage, processing and display. Obviously, sequentially reading the typically millions of pixels for each plate into but a single information channel would be unduly time consuming. By using multiple (e.g., 64) channels or charge-to-voltage converters for reading the plate, one can considerably reduce the time required to read the plate.

The amount of charge per pixel read out from computed radiology substrates tends to be quite small. For example, the amount of charge per pixel of a recently developed substrate is typically on the order of a few picocoloumbs full scale, e.g., less than about 5 or 6 picocoloumbs. The process of measuring such small signals is extremely sensitive to noise. In fact, noise sources which are normally ignored in traditional design must be either eliminated or compensated for to accurately measure the charge on each pixel.

In addition to reducing random noise, structured noise contributing to artifacts in the final image should also be reduced in such a system. One important source of structured noise in such a system is the noise associated with differences in channel characteristics (the input-output transfer function of the channel, defined by the offset and gain of the channel), typically due to varying component characteristics. Even high performance components perform within a given tolerance, and components in one channel typically have slightly different characteristics than corresponding components in the other channels. Each channel is typically dedicated to reading a fixed number of columns of image data, and therefore, differences between the channel characteristics tend to produce visual artifacts in the form of stripes in the image. Such noise can be termed "structured" noise (as compared with random noise) because it is inherent in the structure of the system and because it occurs repeatedly in each image produced by the system. To produce high quality images, it is important to reduce structured noise associated with such varying component characteristics.

OBJECTS OF THE INVENTION

Accordingly, it is a primary object of the present invention to provide an apparatus for and method of compensating for performance differences between the channels of a data acquisition system.

Another object of the present invention is to provide an apparatus for and method of estimating the gain and offset associated with each channel.

Yet another object of the present invention is to reduce the random noise associated with the measurement of the channel gains and the channel offsets.

Still another object of the present invention to provide an apparatus and method for use with the data channels of a data acquisition system that permits one to make reliable measurements of extremely low level data signals such as provided by a computed radiology plate.

Other objects and advantages of the present invention will become apparent upon consideration of the appended drawings and description thereof.

SUMMARY OF THE INVENTION

These and other objects are achieved by a system that characterizes for a set (of N information channels a corresponding set of offsets and gains that define the respective transfer functions for the information channels. The system contains memory for storing the offset and gain values associated with each channel. A pixel value provided from the computed radiology plate to an information channel is mathematically adjusted (normalized) as a function of that channel's respective input-output transfer function so that variations in offset and gain from channel to channel are substantially eliminated.

The system preferably repeatedly measures the offset and gain of each information channel between the processing of each or a series of data signals representative of corresponding pixel values through the channel, and further includes filters for reducing the effect of random noise on the measurements of the offsets and gains by generating time weighted averages of the offset and gain for each information channel.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE DRAWINGS

Figure 1:
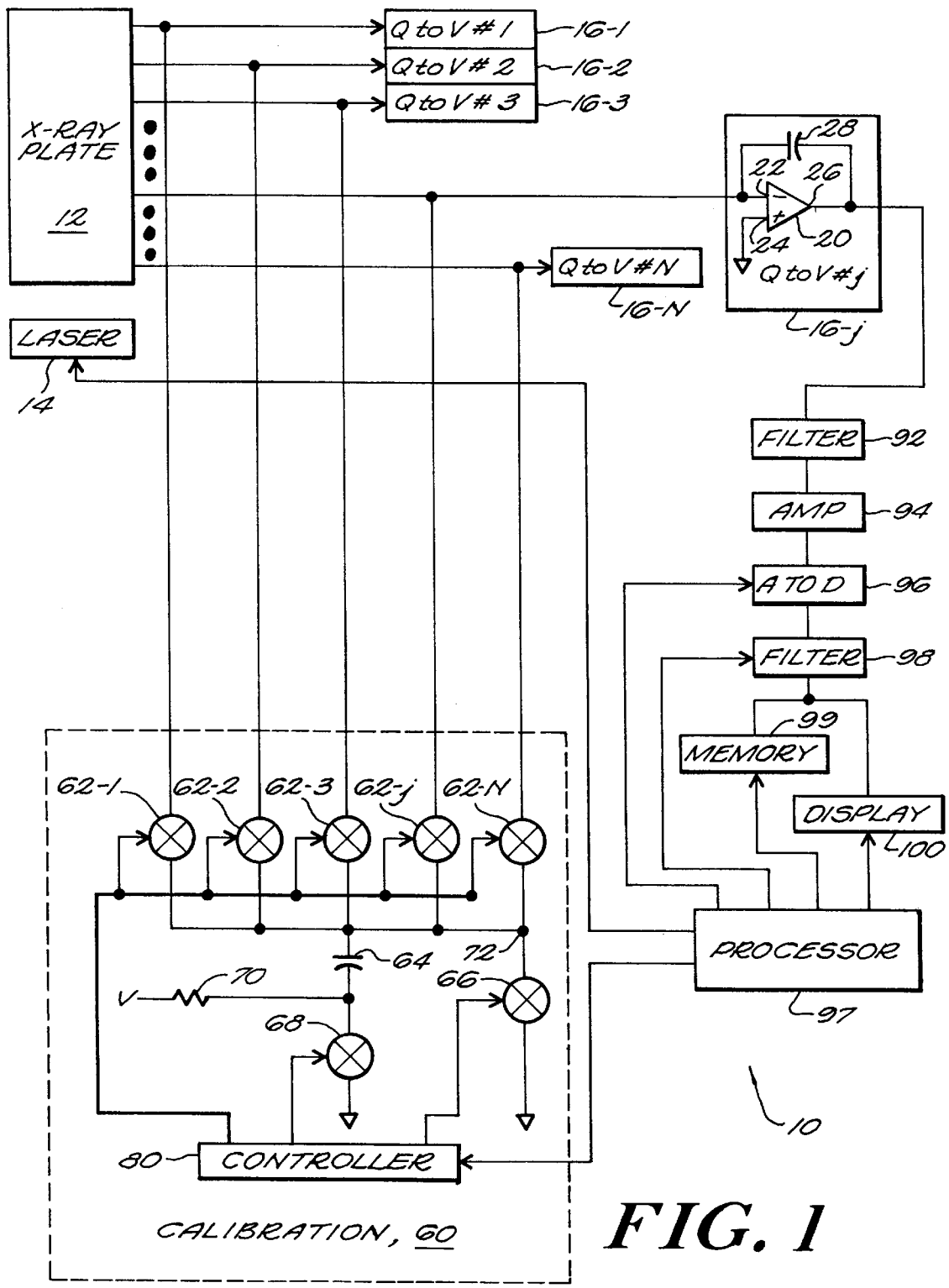
FIG. 1 is a partial schematic, partial block diagram of a data acquisition system incorporating the present invention, and including a set of information channels used for reading image information from a computed radiology plate.

Referring to FIG. 1, a data acquisition system 10, incorporating the present invention, is shown as adapted to read the output of a computed radiology plate 12 organized as an array of rows and columns of pixels. In one preferred embodiment, plate 12 has approximately 5000 rows and approximately 4000 columns of pixels. Exposing plate 12 with X-ray radiation leaves a latent charge on each pixel, as a function of the amount of radiation to which the pixel has been exposed. In order to determine the amount of latent charge stored at each pixel so that the X-ray image can be stored in a data base, and/or reproduced, means for discharging each pixel and measuring the discharge is provided. The means for discharging the pixels preferably comprises a laser 14 for providing a scanning laser beam which scans the array row by row, or column by column, in a raster scan. As each pixel is exposed to the laser beam it is discharged and the change is read through an interface (not shown) to one of the N channels. In one embodiment, N equals 64 meaning that there are 64 channels (although the number can clearly vary), and each channel is dedicated to reading out a select group of pixels selected so as to provide a maximum time interval between successive data signals provided through each channel for minimizing cross-talk between channels. Each channel contains a charge to voltage converter 16 for successively reading the charge on the pixels which are coupled to the channel.

FIG. 1 shows the jth charge to voltage converter 16$j$ in detail. Each charge to voltage converter 16 contains a well known operational amplifier 20 having an inverting input 22, a non-inverting input 24, and an output 26. An integrating capacitor 28 is coupled between inverting input 22, and output 26. Inverting input 22 is further coupled to the appropriate pixels of plate 12, and non-inverting input 24 is coupled to ground. A single pixel is read out by accessing and reading the latent charge stored at the pixel, typically by scanning the pixel with a laser beam for a brief period of time, and allowing the charge in that pixel to accumulate on capacitor 28 during a period of time known as an integration window. The charge to voltage converter thus generates a voltage output at output 26 that is related to the charge on plate 12 at that pixel location.

The output of the charge to voltage converter 16 is then filtered by filter 92, amplified by amplifier 94 and then converted to a digital signal by an analog to digital (A/D) converter 96. The output of converter 96 is then digitally filtered by filter 98, and subsequently stored and/or displayed in memory 99 and display 100. A processor 97 is provided for processing the signal output of A/D converter 96, as described hereinafter. Components 92, 94, 96, 97, 98, 99 and 100 may be shared by all the information channels via a multiplexing arrangement (not shown), or alternatively, each channel may contain its own set of post processing components such as filter 92, amplifier 94, converter 96 and filter 98.

The system 10 also contains calibration circuitry 60 which may be used to inject a specific amount of charge $Q_c$ into each of the charge to voltage converters 16 as described in greater detail in U.S. patent application Ser. No. 08/594,122, now allowed, entitled Apparatus for and Method of Autozeroing the Input of a Charge-to-Voltage Converter filed in the names of Hans Weedon and Roger Finch (Attorney's Docket No. ANA-51). The usefulness of such a charge injection also will be discussed below. Calibration circuitry 60 contains a bank of N switches 62, one for each channel. Each switch 62 has one pole connected to the input of a corresponding charge to voltage converter 16. Each of the other poles of all the switches 62 are coupled to a common bus 72. Bus 72 is further connected to one pole of a switch 66, and the other pole of switch 66 is coupled to ground. A capacitor 64 is coupled in series between bus 72 and one pole of a switch 68, and the other pole of switch 68 is coupled to ground. One terminal of a resistor 70 is coupled to the junction connecting capacitor 64 and switch 68, and the other terminal of resistor 70 is coupled to a voltage source V. A controller 80 provides independent control for switches 62, 66, and 68. Controller 80 can be an appropriately programmed digital computer, processor, or the like. Switches 62, 66, and 68 may be implemented as FET switches, or the like.

The operation of calibration circuitry 60 will now be discussed. During normal operation of the system 10, controller 80 maintains all of the N switches 62 in an open position to isolate the calibration circuitry 60 from the information channels. The calibration circuitry 60 is used, during the calibration period of operation, for injecting charge into individual information channels during periods when image information is not being read through those channel(s) from plate 12. The calibration period of operation can occur between successive measurement periods of operation of each channel, or between several measurement periods of operation of each channel, depending upon how frequently it is desired to update the values of offset and gain associated with that channel. Further, all or a select group of the channels can be calibrated at the same time, although preferably each is separately calibrated at a different time from the others in a predetermined sequence with the others so as to prevent any affect of one channel on another channel during the calibration of each channel. Controller 80 also normally maintains switches 66 and 68 in a closed position when not in the calibration mode of operation so as to connect both sides of capacitor 64 to ground and prevent any charge from building up on bus 72. During the calibration period of operation for the jth channel, the charge $Q_c$ is injected into the jth channel by closing switch 62j at the beginning of the calibration period, and simultaneously opening switches 66 and 68 for a predetermined time interval $T_c$, which defines the calibration period. This couples the voltage source V through resistor 70 and capacitor 64 to the jth information channel for the time period $T_c$, thus charging capacitor 64 and injecting a charge of $Q_c$ into the channel. After this injection of charge, switch 62j is opened and switches 66 and 68 are closed to once again connect both sides of capacitor 64 to ground and remove any spurious charge from bus 72. The charge $Q_c$ may then be injected into the other channels in similar fashion.

As will be discussed in further detail below, the actual value of $Q_c$ need not be known. As long as the voltage V remains constant, and interval $T_c$ is the same for every channel, the amount of charge injected will be substantially the same for each channel, and this is sufficient for purposes of the present invention.

By measuring the offset output voltage for zero charge input, and by measuring the voltage output for a known input charge $Q_c$, and by assuming the gain is linear through the dynamic range of measurement of charge, one can use these values to compensate for one important source of error for system 10, caused by the variance in the transfer characteristics or functions of each of the N channels. Due to differences in performance of the devices composing the channels, such as amplifier 20 and capacitor 28, the transfer characteristics of each channel can be slightly different from other channels. The variance in the input-output transfer characteristics between the channels is typically very small, but since the input signals to the channels are also anticipated to be very small, the variance becomes an important source of error.

Assuming that each channel behaves linearly, the input-output transfer characteristic or function of each channel can be characterized by an offset and a gain. The invention provides a system for characterizing the input-output transfer characteristic of each of the N channels by determining each channel's associated offset and gain. The invention further provides a system for using the measured offsets and gains to substantially reduce or eliminate the error associated with differences among the input-output transfer characteristics of the channels.

The offset and gain of each channel is preferably measured by measuring the outputs in response to two known inputs, with the outputs being converted to digital signals by converter 96 so that they can be further processed in the digital domain by processor 97, although it should be appreciated the two outputs can be processed using analog circuitry to achieve the same result. The offset of each channel is preferably measured by making one of the known inputs equal to zero charge, while the gain is determined by measuring the output of each channel for two known inputs, one of which is preferably zero input charge (the same input for measuring the offset), the other equal to $Q_c$. The two known inputs can therefore be provided by calibration circuitry 60.

The process of measuring the offset and gain of the jth channel will now be discussed. As will be evident to those skilled in the art, the offset and the gain of the other channels are measured in like manner as that described in connection with the jth channel. First the offset of the jth channel is measured by measuring the output of the A/D converter 96 under the following conditions: as usual, plate 12 is coupled to inverting input 22 of amplifier 20; however, the laser beam of laser 12 is not incident on any of the pixels of plate 12 that are connected to the jth channel during the period of calibration of the jth channel, so no pixel charge is transferred to the channel from the plate; and switch 62j is open to decouple the calibration circuit 60 from the channel. The voltage measured at the output of the converter 16j is designated herein as $O_{jm}$, which stands for the measured offset voltage for the jth channel. Ideally $O_{jm}$ is zero, but due to the characteristics of the components used, $O_{jm}$ is typically at a value different from zero. In the absence of some correction, such as provided by the invention described in U.S. patent application Ser. No. 08/594,122, now allowed, entitled Apparatus for and Method of Autozeroing the Input of a Charge-to-Voltage Converter filed in the names of Hans Weedon and Roger Finch (Attorney's Docket No. ANA-51) (wherein a compensation signal equal and opposite to the offset voltage is derived and stored and used to cancel the offset), some small offset voltage is typically present due to the inherent characteristics of the channel. $O_{jm}$ thus represents the offset voltage of the jth channel and therefore one point of the input-output transfer function of the channel.

Once the offset $O_{jm}$ has been measured, the gain of the jth channel is then measured. The gain is preferably measured by performing two measurements. The first measurement is made by measuring the output of the jth channel under the following conditions: the laser beam is not incident on any of the pixels of plate 12 connected to the channel; and as usual, the plate 12 is coupled to the inverting input 22 of amplifier 20; switch 62j is closed to couple the jth channel to the calibration circuitry 60; switch 68 is closed to prevent any current from the voltage source V from being transferred to the channel; and switch 66 is closed so as to connect the inverting input 22 of amplifier 20 to system ground. At this point in time, with zero input and the input to the charge to voltage converter being coupled to the calibration circuitry, the output of the jth channel, which is herein referred to as the offset $O_{jc}$, is measured (as shown in the graph illustrated in FIG. 2), by measuring the output of the analog to digital converter 96. The digital output of converter 96 is stored in memory 97. Again, ideally $O_{jc}$ is zero, but due to the characteristics of the components used, $O_{jc}$ is typically at a value different from zero, and may also be different from the earlier measured value $O_{jm}$.

Calibration circuitry 60 is then operated as described above to inject the known charge $Q_c$ into the jth channel. After charge injection, that is, after switches 66 and 68 have been open for the period of time $T_c$, controller 80 closes switches 66 and 68 to prevent any further injection of charge, and the voltage output of the jth channel is measured at the output of the analog to digital converter 96. This output is designated $V_{jc}$ which herein refers to the voltage output of the jth channel after the charge injection of $Q_c$. The quantity $(V_{jc}-O_{jc})$, the difference between the two measured voltage outputs is then determined by processor 97, divided by the difference between the two inputs corresponding to the two outputs, $(Q_{jc}-0)$, so as to provide a value of gain, the latter being stored in memory 99 with the previously measured value $O_{jm}$ so as to provide the values of offset and gain for the jth channel in memory for subsequent use. Switch 62j is then opened to decouple the jth channel from the calibration circuitry and switches 66 and 68 closed to reset the capacitor 64 for the next calibration operation.

Figure 2:
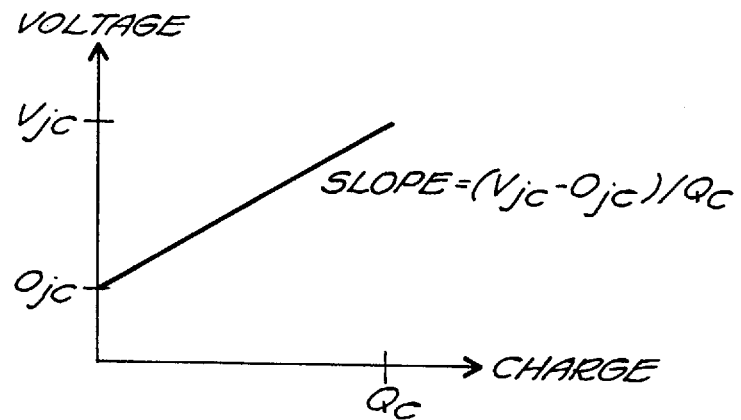
FIG. 2 is a graph of charge versus voltage showing the gain of one of the N channels.

FIG. 2 is a graph of charge versus voltage illustrating the results of the two measurements used to measure the gain. The two points (0, $O_{jc}$) and ($Q_c$, $V_{jc}$) represent the two measurements. Assuming the channel is linear, the gain of the channel is equal to the slope of the line connecting the two measured points. As shown in FIG. 2, the slope of this line, designated $\alpha_j$, is given by the following equation (1).

$$\alpha_j = \frac{V_{jc} - O_{jc}}{Q_c} \qquad (1)$$

As will be discussed in further detail below, the gain may be calculated by measuring the two quantities $V_{jc}$ and $O_{jc}$, and the quantity $Q_c$ need not be precisely measured.

Figure 3:
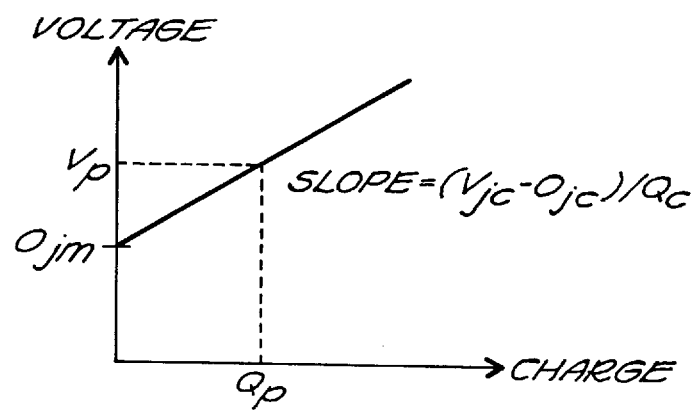
FIG. 3 is a graph of charge versus voltage showing the transfer function of one of the N channels.

Since the input-output transfer function of each channel is assumed to be linear, the values of the offset, $O_{jm}$, and the previously determined gain, $\alpha_j$, fully characterize the jth channel. As shown in FIG. 3 the input-output transfer function of the jth channel is linear and has a slope $\alpha_j$ and a Y-intercept of $O_{jm}$. It should be noted that the offset was measured with the calibration circuitry decoupled from the channel, and the quantity $(V_{jc}-O_{jc})$, which is necessary for calculating the gain, was measured with the calibration circuitry coupled to the channel. Although the offset voltage can vary depending on whether the channel is coupled to the calibration circuitry, the gain of the channel is believed to be independent of whether the channel is coupled to the calibration circuitry. Therefore, these measured values accurately characterize the channel.

When image data is being read from plate 12, it is desirable to measure the latent charge $Q_p$ stored on each pixel. However, this charge is not measured directly and is instead calculated in terms of the voltage output $V_p$ of the A/D converter 96 after the pixel p has been coupled to the channel for the appropriate integration interval and the charge on the pixel has been discharged by exposure to the laser beam of laser 12. As can be seen from FIG. 3, the actual measured charge $Q_p$ can be calculated according to following equation (2):

$$Q_p = \frac{V_p - O_{jm}}{V_{jc} - O_{jc}} Q_c \qquad (2)$$

It should be appreciated that by using the stored offset and gain values for each channel, and determining the measured charge $Q_p$ from each voltage output as a function of the stored offset and gain values, the values of Q, such as $Q_p$, measured by each of the channels are normalized so as to be independent of the actual gain and offset of the channel. The determined values of Q are therefore more accurate than if the assumption were made that the offset and gain were the same for all of the channels.

Figure 4:
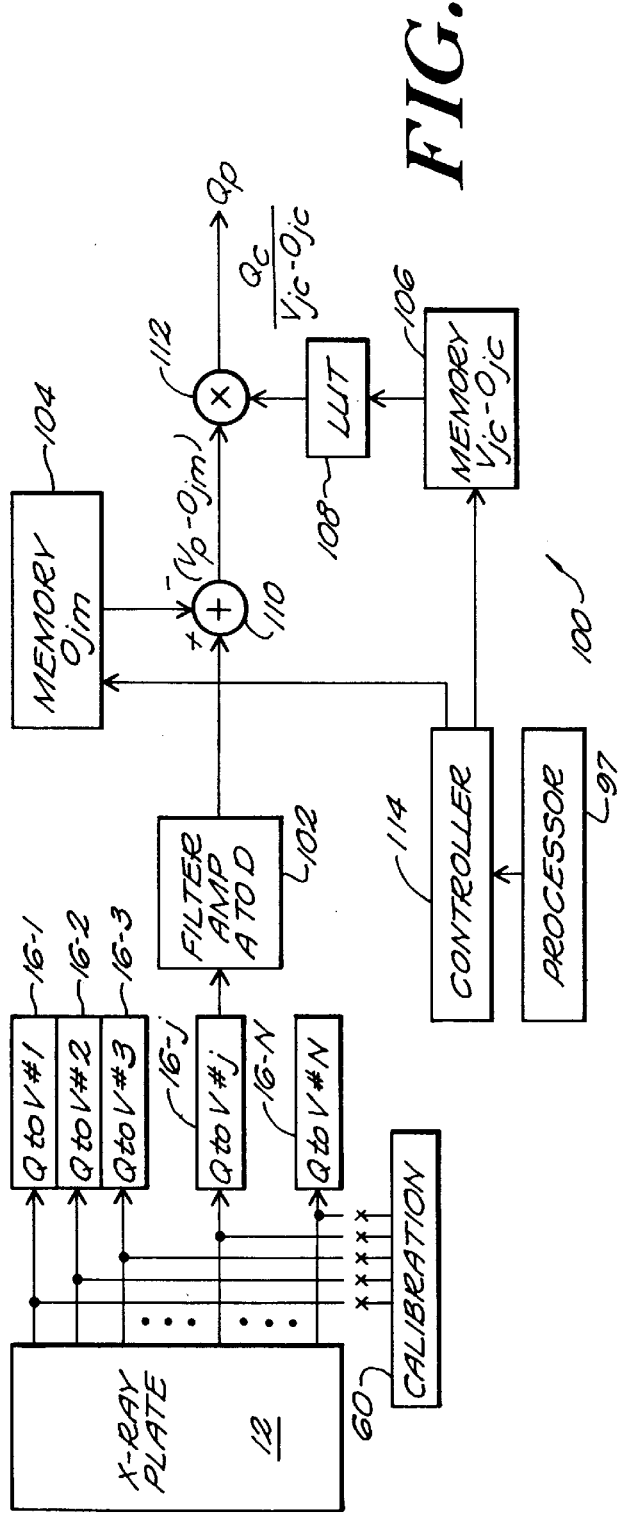
FIG. 4 is a block diagram showing one embodiment according to the invention for calculating the pixel values stored in the computed radiology plate.

FIG. 4 shows one embodiment of a system 100 for calculating $Q_p$ as a function of equation (2). System 100 contains plate 12, calibration circuit 60, and N charge to voltage converters 16. The calibration circuit 60 is shown disconnected from to be information channels, corresponding to switches 62 (shown in FIG. 1) being open. The filter, amplifier, and analog to digital converter of FIG. 1 are shown in FIG. 4 collectively by block 102. The output of block 102 is applied to the positive input of a digital signal subtractor 110. A memory 104, which is configured as a digital memory having at least N storage locations (and included as a part of memory 99 of FIG. 1), is connected to the negative input of subtractor 110. Subtractor 110 provides an output as a function of the difference between the output of converter 102 and the output of memory 104. The output of subtractor 110 is applied to one input of a digital signal multiplier 112. A memory 106, also configured as a digital memory having at least N storage locations (and included as a part of memory 99 of FIG. 1), has its output connected to the input of a look up table (LUT) 108 (which can also be included as a part of memory 99). The output of LUT 108 is connected to the remaining input of digital signal multiplier 112.

The offset $O_{jm}$ and gain $(V_{jc}-O_{jc})/Q_c$ of the J channel, as well as the corresponding offset and gain of each of the other N channels, are pre-calculated as described above, and stored in the corresponding memories 104, 106 and LUT 108. The measured offsets $O_{jm}$ are stored in the memory 104. The measured quantities $(V_{jc}-O_{jc})$ are stored in the memory 106. LUT 108 is programmed to generate an output that is equal to the reciprocal of the gain, i.e., $$\text{LUT OUTPUT} = \frac{1}{\alpha_j} = \frac{Q_c}{(V_{jc} - O_{jc})} \qquad (3)$$

As FIG. 4 shows, the output of digital signal subtractor 110 is the measured voltage less the measured offset, i.e., $(V_p-O_{jm})$. The output of the LUT 108 is the reciprocal value of the gain determined by the calibration steps. The output of multiplier 112 is the desired quantity $Q_p$ calculated according to equation (2) and this normalized by the value of the determined gain so that each measure of Q for each channel is independent of the offset and gain of that channel. Controller 114 provides the necessary address control signals for the memories 104 and 106 to insure that the stored values corresponding to the gain and offset of the jth channel are read out when the jth information channel is active.

Controller 114 can be implemented on a digital computer, processor or the like. Subtractor 110, and multiplier 112 can be implemented with discrete components or as part of an appropriately programmed processor, such as the processor 97 shown in FIG. 1.

The system 100 reduces the errors attributed to differences in gain and offset among the channels by determining the offset and gain of each of the N channels. The latent charge Q on every pixel p is read out by allowing that charge to accumulate in the appropriate channel's charge to voltage converter 16 for an integration period. The voltage output of the charge to voltage converter 16 is then adjusted by the appropriate offset and gain correction to generate the normalized value $Q_p$ representing the charge on the pixel p.

As was stated above, the actual value of the charge $Q_c$ injected by the calibration circuitry 60 need not be precisely known so long as each channel receives the same amount of charge. As can be seen from FIG. 4, LUT 108 scales the quantity $(V_{jc}-O_{jc})$ by the same factor $Q_c$ for all the N channels. So if the numerical value for $Q_c$ used by LUT 108 is different from the actual value of the charge injected by calibration circuitry 60, then a scale factor is introduced into the calculation of $Q_p$. But since the same scale factor is introduced for all of the channels, this error does not contribute to an error in the determination of the individual values of $Q_p$, and is equivalent to scaling the entire image.

The embodiment of FIG. 4 can be improved upon by considering the effects of random noise in the system. While the purpose of the compensation circuitry shown in FIG. 4 is to compensate for errors attributed to variations in gain and offset among the signal processing channels, it should be remembered that there is an element of random noise in each measurement of the channel offsets and the channel gains.

In the embodiments described above, the channel offsets and gains were only sampled once and can be repeatedly sampled without regard to the previous samples. Since each sample was actually a sample of the desired signal plus an element of random noise, sampling only once without regard to prior samples essentially locks one measurement of the random noise into the system. In the preferred embodiment, rather than using the sampled offsets and gains, $O_{jm}$ and $\alpha_j$, it is preferred to use weighted averages $\overline{O}_{jm}$, and $\overline{\alpha}_j$. The weighted averages can be computed by a variety of well known statistical methods. Since random noise is stochastic exhibiting a Gaussian distribution, averaging the noise tends to result in cancellation of errors due to the random noise. The goal of computing such weighted averages is thus to reduce or eliminate the effect of the random noise and still allow the computed average to track changes in the unfiltered signal that occur over time.

One preferred method of computing the weighted averages is to compute them using recursive filters. In general, a recursive filter computes a weighted average of a series of consecutive samples by multiplying the current sample by a factor of k, and adding this to the last value of the average multiplied by the factor (k−1). This filter is described in equation form by the following equation (4):

$$\overline{X}_t = kX_t + (1-k)\overline{X}_{t-1} \tag{4}$$

In keeping with standard notation, $\overline{X}$ designates the weighted average of a predetermined number of consecutive signal sample values received just prior to the present signal sample, and X denotes the unfiltered present signal sample.

Figure 5:
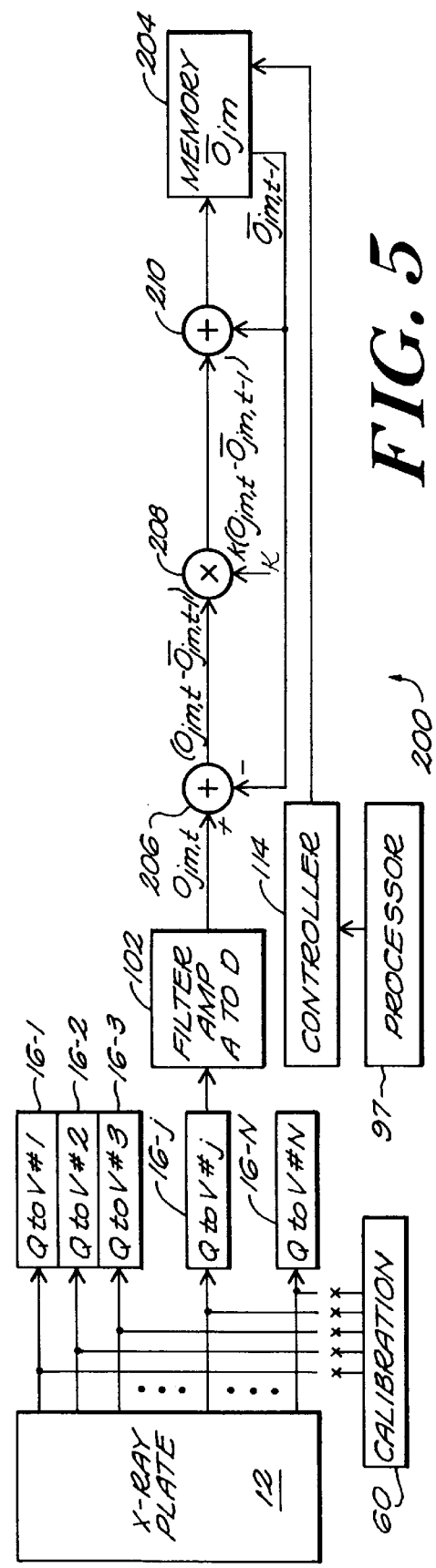
FIG. 5 is a block diagram showing one embodiment according to the invention of a recursive filter for calculating a weighted average of the channel offsets.

FIG. 5 shows a preferred embodiment of a recursive filter 200 for calculating the N weighted averages $\overline{O}_{jm}$, according to the following equation (5):

$$\overline{O}_{jm,t} = kO_{jm,t} + (1-k)\overline{O}_{jm,t-1} \tag{5}$$

wherein $\overline{O}_{jm,t-1}$ designates the weighted average from the sample period t−1, and $\overline{O}_{jm,t}$ designates the new weighted average from the current sample period t.

The filter 200 uses memory 204 for storing the average value of the offset for each channel, the symbol $\overline{O}_{jm}$ representing the average offset for the j channel. Like memory 104 (shown in FIG. 4), memory 204 is configured as a digital memory having at least N storage locations for storing each value of the average $\overline{O}_{jm}$ for each of the N channels. The filter contains a digital signal subtractor 206, a digital signal multiplier 208, and a digital signal adder 210. The positive input of subtractor 206 is coupled to the output of (the A/D converter of) block 102. The negative input of subtractor 206 is coupled to memory 204. So at the end of every sampling period t, the output of subtractor 206 is the current sample minus the previous value of the average, or $(O_{jm,t} - \overline{O}_{jm,t-1})$. The output of subtractor 206 is coupled to one input of multiplier 208, and the other input of multiplier 208 is set to the constant value k. Multiplier 208 thus scales the output of subtractor 206 by the constant k. The output of multiplier 208, $k(O_{jm,t} - \overline{O}_{jm,t-1})$, is coupled to one input of adder 210, and the other input of adder 210 is coupled to the output of memory 204, $\overline{O}_{jm,t-1}$. Thus, the output of adder 210 provides a quantity given by the following equation (6):

$$\overline{O}_{jm,t} = k(O_{jm,t} - \overline{O}_{jm,t-1}) + \overline{O}_{jm,t-1} \tag{6}$$

The output of adder 210 is the new value of $\overline{O}_{jm,t}$ which drives the data input of memory 204 and replaces the value of $\overline{O}_{jm,t-1}$ with this new value of the average offset.

As those skilled in the art will appreciate, equation (6) is equivalent to equation (5). Filter 200 is an implementation of the recursive filter described by equation (5) that uses only one multiplier. Other arrangements of equivalent recursive filters are well known.

The selection of the value k for use with filter 200 represents a design choice. As those skilled in the art will appreciate, if k is relatively small, then the filter will suppress the effects of the random noise to a great extent. However, if k is relatively small, then the weighted average $\overline{O}_{jm}$ will not track changes in the unfiltered signal $O_{jm}$ quickly. In other words, there will be a long delay before the average signal $\overline{O}_{jm}$ tracks real changes in the unfiltered signal $O_{jm}$. This tradeoff between noise suppression and the ability to track the input signal is well understood by those skilled in the art of filter design.

In general, recursive filters provide noise suppression as described by equation (7).

$$\overline{\sigma} = \frac{\sigma}{\sqrt{2k^{-1} - 1}} \tag{7}$$

In equation (7), $\sigma$ is the standard deviation of the unfiltered variable, and $\overline{\sigma}$ is the standard deviation of the filtered variable. So if k is 1/32, the standard deviation of the filtered variable is reduced by a factor of approximately 8.

In general, recursive filters take about 10 time constants to track a change in the input signal, so if k is 1/32, about 320 samples are required before the filtered variable will track a change in the unfiltered variable.

As relates to the present invention, it takes about TN(10/k) seconds for the filtered variable to track a change in the unfiltered variable, where T is the time it takes to read one pixel, N is the number of information channels, and the 10/k term factors in the 10 time constants.

In one preferred embodiment, k is 1/32, N is 64, and T is approximately 100 $\mu$ seconds. So in this embodiment, it takes approximately 2 seconds for $\overline{O}_{jm}$ to track changes in $O_{jm}$. In this embodiment, it typically takes approximately 30 seconds to read one image from plate 12. During this 30 seconds, the temperature of the plate may vary significantly, in part because the plate is being scanned by a laser. The offsets, $O_{jm}$, vary with temperature so it is important for the filtered signal $\overline{O}_{jm}$ to be able to track changes in the channel offsets $O_{jm}$ during the time that a single image is read from plate 12. Although the offsets can vary to a large extent over the 30 seconds, they do not vary appreciably over a window of 2 seconds. Therefore, a choice of k equal to 1/32 is preferred for this embodiment.

To provide sufficient updating of the filtered offset values, $\overline{O}_{jm}$, a new sample of the offset values $O_{jm}$ is provided to filter 200 after every row of pixels is scanned. Typically, when an image is being read out of plate 12, there is some dead time between the time that the laser beam finishes scanning one row, and the time that the laser beam begins to scan the next row. Preferably, during this dead time, controller 114 provides a new set of samples of the channel offsets to filter 200 and updates the filtered values contained in memory 204.

In the preferred embodiment, similar recursive filters are used to calculate the channel gains as well as the channel offsets. In the preferred embodiment the recursive filters are initialized by clearing their associated memories. Therefore, the first sample stored in one of the memories after initialization is reduced by a factor of k, and the value of the weighted average slowly builds up over time as more samples are taken. In an alternative embodiment, the first sample taken after initialization is stored directly in the appropriate memory without scaling by the factor k. As those skilled in the art of filter design will appreciate, this allows the filter to start with a value approximating the full value, rather than having to build up the value of the average over time. In this embodiment, the filters include components that allow the incoming sample to selectively bypass the scale factor of k.

Figure 6:
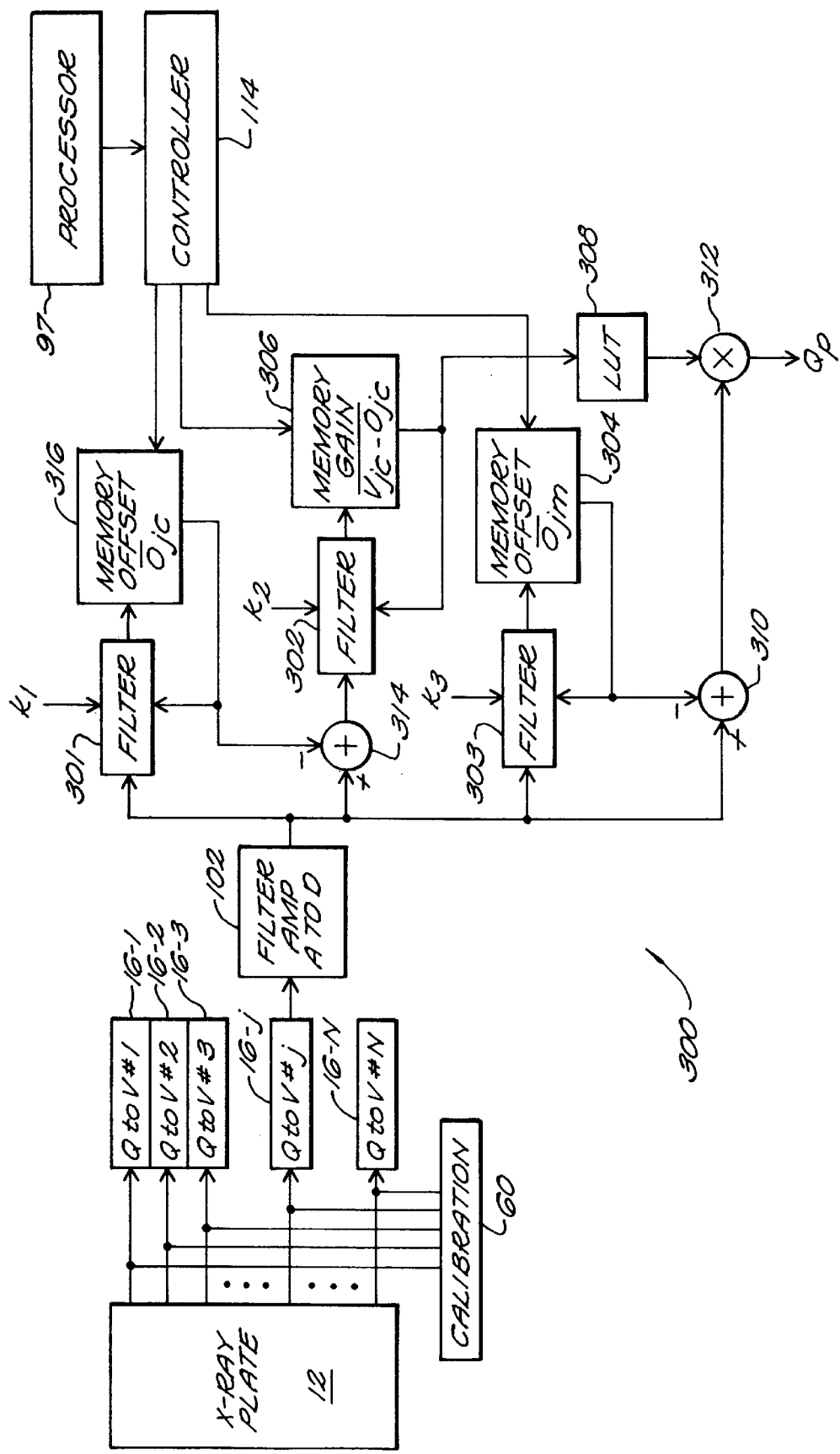
FIG. 6 is a block diagram showing a preferred embodiment according to the invention for calculating the pixel values stored in the computed radiology plate.

FIG. 6 shows one preferred embodiment of a system 300 for compensating for the structured noise. System 300 has three recursive filters 301, 302, 303. Each of the three filters is structurally similar to filter 200 (shown in FIG. 5).

The output of the analog to digital converter block 102 is coupled to the first input of filter 301. The second input of filter 301 is set to a constant value k1. The third input of filter 301 is driven by the output of memory 316, and the output of filter 301 feeds the data input of memory 316. Filter 301 computes $k_1$ times the value present on its first input plus $(1-k_1)$ times the value present on its third input. Controller 114 only operates filter 301 when calibration circuitry 60 is coupled to the relevant channel, such that the average of the offsets, $\overline{O}_{jc}$, are computed and stored in memory 316.

Filter 302 is used to calculate the average of the quantity, $(V_{jc}-O_{jc})$. Controller 114 only operates filter 302 and its associated components when the calibration circuitry has injected the charge $Q_c$ into the charge to voltage converters 16. The output of converter 102 is coupled to the positive input of subtractor 314. The negative input of subtractor 314 is coupled to the output of memory 316. So subtractor 314 outputs the quantity $(V_{jc}-\overline{O}_{jc})$. The output of subtractor 314 feeds the first input of filter 302. The second input of filter 302 is set to the constant value $k_2$. The third input of filter 302 is driven by the output of memory 306, and the output of filter 302 drives the data input of memory 306. Filter 302 computes $k_2$ times the value on its first input plus $(1-k_2)$ times the value on its third input. Controller 114 operates filter 302 such that the average of the quantity $(V_{jc}-\overline{O}_{jc})$ is computed and stored in memory 306.

Filter 303 is used to calculate the average of the channel offsets, $O_{jm}$. The first input of filter 303 is driven by converter 102. The second input of filter 303 is set to the constant value $k_3$. The third input of filter 303 is driven by the output of memory 304, and the output of filter 303 drives the data input of memory 304. Filter 303 computes $k_3$ times the value on its first input plus $(1-k_3)$ times the value on its third input. Controller 114 operates filter 303 such that the average of the channel offsets are computed and stored in memory 304.

The output of analog to digital converter block 102 also drives the positive input of subtractor 310. The output of memory 304 drives the negative input of subtractor 304. So, when pixel data is being read out of plate 12, subtractor 310 outputs the value $(V_p-\overline{O}_{jm})$. The output of subtractor 310 drives one input of multiplier 312. The output of memory 306 drives the input of LUT 308, and the output of LUT 308 drives the other input of multiplier 312. LUT 308 operates in like fashion as LUT 108 (shown in FIG. 4), and provides an output that is the reciprocal of its input times the value $Q_c$. So when a pixel is being read out of plate 12, the charge on the pixel can be read at the output of multiplier 312 which calculates $Q_p$ according to Equation (8).

$$Q_p = \frac{(V_p - \overline{O}_{jm})}{\overline{V}_{jc} - \overline{O}_{jc}} \cdot Q_c \qquad (8)$$

As was described above, a preferred choice for $k_1$ is 1/32. Also described above, the offsets $O_{jm}$, are remeasured during the dead time between the scanning of pixel rows because these offsets can vary significantly during the time that an image is read out of plate 12 and therefore need to be frequently updated. Typically, the channel gains do not vary significantly during the time that an image is read out of plate 12. So generally, the values for the channel gain averages are not recomputed as an image is being read out of plate 12. In the preferred embodiment, the channel gain averages are computed prior to reading pixel data out of plate 12, so therefore the choice of $k_2$ and $k_3$ are less critical than the choice of $k_1$. However, a preferred choice is to set both $k_2$ and $k_3$ to 1/32.

The system thus described provides compensation for performance differences between the channels of a data acquisition system. This is accomplished by estimating the gain and offset associated with each channel. The system as described also further reduces the random noise associated with the measurement of the channel gains and the channel offsets. The system thus described permits one to make reliable measurements of extremely low level data signals such as provided by a computed radiology plate.

The input-output transfer function of each of the channels has been described in terms of a linear function simply characterized by an offset and a gain. As those skilled in the art will appreciate, the input-output transfer function of each channel could also be modeled by a gain function which is modeled as a quadratic, or higher order equation. In this case, each of the coefficients would be computed in a manner similar to that described above.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A data acquisition system including a plurality of data acquisition channels, said system comprising:
   A. a plurality of signal converters, each of said converters (a) having an input and an output, (b) being disposed within at least a corresponding one of said channels and (c) having an input-output transfer function characterized by an associated (i) offset and (ii) a gain function, whereby an input signal provided to each of said converters produces an associated output value as a function of said associated offset and said gain function;
   B. means for measuring the associated offset and gain function of each of said converters;
   C. memory means for storing values as a function of the measured offset and gain function for each of said converters; and
   D. means for generating a compensated value, representative of said input signal to said converter, as a function of said stored values and said associated output value, so that said compensated value is substantially independent of said associated offset and gain function of each of said converters.

2. A data acquisition system including a plurality of data acquisition channels, said system comprising:

A. a plurality of signal converters, each of said converters (a) having an input and an output, (b) being disposed within a corresponding one of said channels and (c) having an input-output transfer function characterized by an associated offset and gain, whereby an input signal provided to each of said converters produces an associated output value as a function of said offset and said gain;

B. means for measuring the associated offset and gain of each of said converters;

C. memory means for storing values as a function of the measured offset and gain for each of said converters; and D. means for generating a compensated value, representative of said input signal to each of said converters, as a function of said stored values and said associated output value, so that said compensated value is substantially independent of the associated offset and gain of each of said converters.

3. A data acquisition system according to claim 2, wherein the number of channels is N and said memory means comprises a digital memory having at least 2N storage locations.

4. A data acquisition system according to claim 2, wherein each of said signal converters is a charge to voltage converter.

5. A data acquisition system according to claim 4, wherein said means, responsive to the stored values, for correcting for variations in the offset and gain from converter to converter includes computation means, coupled to each of said converter outputs and to said memory means, for computing the corrected value of an output signal representative of a signal present at the converter input, said means for computing the corrected value includes means for subtracting said offset associated with said converter from said converter output signal and stored in said memory means so to produce an intermediate quantity, means for scaling said intermediate quantity by the reciprocal of said gain associated with said converter and stored in said memory means.

6. A data acquisition system according to claim 4, wherein said computation means includes subtracting means for subtracting the associated offset stored in said memory means for the output signal of said converter.

7. A data acquisition system according to claim 6, wherein said computation means further includes multiplier means for generating an output signal representative of the product of the output of said subtracting means the reciprocal of said gain.

8. A data acquisition system according to claim 2, further including filter means for generating a weighted average of said offsets and storing said weighted average.

9. A data acquisition system according to claim 8, wherein said filter means comprises a recursive filter.

10. A data acquisition system including a plurality of data acquisition channels, said system comprising:

A. a plurality of signal converters, each of said converters (a) having an input and an output, (b) being disposed within a corresponding one of said channels and (c) having an input-output transfer function characterized by an associated offset and gain;

B. means for measuring said associated offset and gain of each of said converters, recursive filter means for generating a weighted average of said associated offsets and storing said weighted average, said recursive filter means including subtraction means for generating a signal as a function of the difference between a signal as a function of the offset at the output of the corresponding converter and a signal as a function of the weighted average of said offsets;

C. memory means for storing values as a function of the measured offset and gain for each of said converters; and D. means, responsive to the stored values, for correcting for variations in the offset and gain from converter to converter so that the outputs of all of the signal converters are substantially the same in response to the same input.

11. A data acquisition system according to claim 10, wherein said recursive filter further includes a multiplier for generating a signal representative of the product the output of said subtraction means and a constant value k.

12. A data acquisition system according to claim 11, wherein said recursive filter further includes an adding means, coupled to said memory means, for providing an output signal representative of a sum of the values of the output of said multiplier means, and said memory means so that said output signal can be stored in said memory means.

13. Apparatus for correcting for variations in the input-output transfer functions of a plurality of signal converters of a corresponding plurality of signal processing channels of a data acquisition system so that all of the converters provide substantially the same output for a given input from an image detection system, said apparatus comprising: means for measuring a first output signal of each converter with the input of said converter having a first input value, said means for measuring a first output signal including means for providing a first average output signal of each converter as a function of several measurements of said first output signal; means for measuring a second output signal of each converter with the input of said converter having a second input value, said means for measuring a second output signal including means for providing a second average output signal of each converter as a function of several measurements of said second output signal; means for determining the gain of each of said converters as a function of said first and second input and first and second average output values; means for measuring a third output signal of each converter with the input of said converter connected to said image detection system and determining the offset of said converter as a function of said third output signal; and means for storing data as a function of the measured gain and offset for each of said converters so that an output signal of each of said converters can be subsequently normalized as a function of said stored data.

14. Apparatus according to claim 13, wherein said means for providing a first average output signal of each converter and said means for providing a second average output signal includes recursive filer means for determining said average output signals.

15. A data acquisition system including a plurality of data acquisition channels, said system comprising:

A. a plurality of signal converters, each of said converters (a) having an input and an output, (b) being disposed within at least a corresponding one of said channels and (c) having an input-output transfer function characterized by an offset and a gain function;

B. calibration means for generating a common calibrating signal to the input of each of said converters;

C. means for selectively connecting said calibration means to the input of each of said converters;

D. means for measuring a first associated offset value of each of said converters when said calibration means is connected to the input of said corresponding converter, a second associated offset value when said calibration means is disconnected from the input of said corresponding converter, and the gain function as a function of the output value of said corresponding converter in response to said common calibration signal applied to the input of said corresponding converter and said associated offset values;

E. memory means for storing values as a function of the measured associated offset values and said gain function for each of said converters; and F. means, responsive to the stored values, for correcting the output values for variations in the offset and gain function from converter to converter as a function of said first and second associated offset values and gain function so as to normalize the input-output transfer function of said converters so that the output values of all of the signal converters are substantially the same in response to the same input.

16. A data acquisition system including a plurality of data acquisition channels, said system comprising:

A. a plurality of signal converters, each of said converters (a) having an input and an output, (b) being disposed within a corresponding one of said channels and (c) having an input-output transfer function characterized by an associated offset and gain;

B. means for measuring the associated offset and gain of each of said converters as a function of a first measured offset value when the input of the converter is connected to receive a calibration signal, a second measured offset value when the input of the converter is disconnected from receiving the calibration signal, and a measured output value in response to the calibration signal applied to the input of the corresponding converter;

C. memory means for storing values as a function of the measured offset values and measured output values for each of said converters; and D. means, responsive to the stored values, for correcting an output value for variations in the offset and gain from converter to converter as a function of the measured associated offsets and measured output values so that the output values of all of the signal converters are substantially the same in response to the same input.

17. A data acquisition system according to claim 16, wherein the number of channels is N and said memory means comprises a digital memory having at least 2N storage locations.

18. A data acquisition system according to claim 16, wherein each of said signal converters is a charge to voltage converter.

19. A data acquisition system according to claim 18, wherein said means, responsive to the stored values, for correcting for variations in the offset and gain from converter to converter includes computation means, coupled to each of said converter outputs and to said memory means, for computing the corrected value of an output signal representative of a signal present at the converter input, said means for computing the corrected value includes means for subtracting said offset associated with said converter from said converter output signal and stored in said memory means so to produce an intermediate quantity, means for scaling said intermediate quantity by the reciprocal of said gain associated with said converter and stored in said memory means.

20. A data acquisition system according to claim 18, wherein said computation means includes subtracting means for subtracting the associated offset stored in said memory means for the output signal of said converter.

21. A data acquisition system according to claim 20, wherein said computation means further includes multiplier means for generating an output signal representative of the product of the output of said subtracting means the reciprocal of said gain.

22. A data acquisition system according to claim 16, further including filter means for generating a weighted average of said offsets and storing said weighted average.

23. A data acquisition system according to claim 22, wherein said filter means comprises a recursive filter.

24. A data acquisition system according to claim 23, wherein said recursive filter includes subtraction means for generating a signal as a function of the difference between a signal as a function of the offset at the output of the corresponding converter and a signal as a function of the weighted average of said offsets.

25. A data acquisition system according to claim 24, wherein said recursive filter further includes a multiplier for generating a signal representative of the product of the output of said subtraction means and a constant value k.

26. A data acquisition system according to claim 25, wherein said recursive filter further includes an adding means, coupled to said memory means, for providing an output signal representative of a sum of the values of the output of said multiplier means, and said memory means so that said output signal can be stored in said memory means.

27. Apparatus for correcting for variations in the input-output transfer functions of a plurality of signal converters of a corresponding plurality of signal processing channels of a data acquisition system so that all of the converters provide substantially the same output for a given input from an image detection system, said apparatus comprising:

means for measuring a first output signal value of each converter with the input of said converter having a first input signal;

means for measuring a second output signal value of each converter with the input of said converter having a second input signal;

means for measuring a third output signal value of each converter with the input of said converter connected to said image detection system and determining the offset of said converter as a function of said third output signal value;

means for determining the gain and offset of each of said converters as a function of said first, second and third output signal values; and means for storing data as a function of the measured gain and offset for each of said converters so that an output signal value of each of said converters can be subsequently normalized as a function of said stored data.

28. Apparatus according to claim 27, further including means for generating and applying said first and second signal values to the input of each of said converters.

29. Apparatus according to claim 28, wherein said first signal value is equal to system ground, and said second signal value is equal to a predetermined signal level.

30. Apparatus according to claim 29, wherein said third signal value is equal to the value the output from the data acquisition system in the absence of a data signal from said data acquisition system.

31. Apparatus according to claim 27, wherein said means for measuring the first output signal of each converter with the input of said converter having a first input value includes means for providing a first average output signal of each converter as a function of several measurements of said first output signal;

said means for measuring the second output signal of each converter with the input of said converter having a second input value includes means for providing a second average output signal of each converter as a function of several measurements of said second output signal; and means for determining the gain of each of said converters as a function of said first and second average output values.

32. Apparatus according to claim 31, wherein said means for providing a first average output signal of each converter and said means for providing a second average output signal includes recursive filer means for determining said average output signals.

* * * * *

UNITED STATES PATENT AND TRADEMARK OFFICE
CERTIFICATE OF CORRECTION

PATENT NO.: 5,815,418

DATED: September 29, 1998

INVENTOR(S): Enrico Dolazza et al.

It is certified that errors appear in the above-identified patent and that said Letters Patent is hereby corrected as shown below:

Claim 14, column 14, line 52, delete "filer" and subtitute therefor -- filter --; and Claim 32, column 18, line 10, delete "filer" and substitute therefor -- filter --.

Signed and Sealed this

Fifth Day of January, 1999

Attest:

Attesting Officer

*Acting Commissioner of Patents and Trademarks*